(12) United States Patent
Binzer et al.

(10) Patent No.: US 9,500,745 B2
(45) Date of Patent: Nov. 22, 2016

(54) RADAR SENSOR FOR MOTOR VEHICLES

(75) Inventors: Thomas Binzer, Ingersheim (DE);
Volker Gross, Ditzingen (DE);
Raphael Hellinger, Pforzheim (DE);
Andre Treptow, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 13/976,550

(22) PCT Filed: Nov. 8, 2011

(86) PCT No.: PCT/EP2011/069591
§ 371 (c)(1),
(2), (4) Date: Jan. 6, 2014

(87) PCT Pub. No.: WO2012/089385
PCT Pub. Date: Jul. 5, 2012

(65) Prior Publication Data
US 2014/0104097 A1  Apr. 17, 2014

(30) Foreign Application Priority Data

Dec. 29, 2010 (DE) .......................... 10 2010 064 348

(51) Int. Cl.
*G01S 13/02* (2006.01)
*G01S 13/93* (2006.01)
(Continued)

(52) U.S. Cl.
CPC ................. *G01S 13/02* (2013.01); *G01S 7/41* (2013.01); *G01S 13/4445* (2013.01); *G01S 13/931* (2013.01); *H01Q 3/30* (2013.01); *H01Q 21/061* (2013.01); *H01Q 25/00* (2013.01); *G01S 13/343* (2013.01); *G01S 2013/9325* (2013.01)

(58) Field of Classification Search
CPC .. G01S 13/02; G01S 13/343; G01S 13/4445; G01S 13/931; G01S 2013/9325; G01S 7/41; H01Q 21/061; H01Q 25/00; H01Q 3/30

USPC .......................................................... 342/74
See application file for complete search history.

(56) References Cited

U.S. PATENT DOCUMENTS 5,369,409 A  11/1994  Urabe et al.
RE36,095 E   2/1999   Urabe et al.
(Continued)

FOREIGN PATENT DOCUMENTS

CN  101779141 A  7/2010
DE  103 40 835    4/2004
(Continued)

OTHER PUBLICATIONS

Robert Bosch GmbH, Felbe Reihe series, 2002 ed., Technische Unterrichtung: "Adaptive Fahrgeschwindigkeitsregelung ACC [Adaptive Speed Regulation ACC]".

*Primary Examiner* — Timothy A Brainard
(74) *Attorney, Agent, or Firm* — Norton Rose Fulbright US LLP; Gerard Messina

(57) ABSTRACT

A radar sensor for motor vehicles, having an antenna system that can be controlled by a control device so that it has a temporally varying directional characteristic, and having an evaluation device for evaluating the radar echoes received by the antenna system and for the location of objects using angular resolution, wherein the antenna system has at least two groups of antenna elements that differ in elevation in their effective direction, and the control device is fashioned to activate and deactivate the two groups in periodically alternating fashion, and the evaluation device is configured to estimate the elevation angle of the objects on the basis of a contrast between the radar echoes received by the various groups.

5 Claims, 3 Drawing Sheets

(51) Int. Cl.
*H01Q 3/30* (2006.01)
*H01Q 21/06* (2006.01)
*H01Q 25/00* (2006.01)
*G01S 7/41* (2006.01)
*G01S 13/44* (2006.01)
*G01S 13/34* (2006.01)

(56) References Cited

U.S. PATENT DOCUMENTS

2004/0145513 A1* 7/2004 Katayama ............... G01S 7/032
                                                                342/70
2008/0258964 A1* 10/2008 Schoeberl ............... G01S 7/032
                                                                342/189
2008/0266171 A1* 10/2008 Weber ..................... G01S 7/003
                                                                342/123
2008/0291077 A1* 11/2008 Chang ..................... G01S 13/89
                                                                342/59
2011/0095937 A1    4/2011 Klar et al.

FOREIGN PATENT DOCUMENTS

DE        102 56 524       7/2004
DE     10 2009 047 561     6/2011
EP         1 306 925       5/2003
JP         2008 151583     7/2008

* cited by examiner

RADAR SENSOR FOR MOTOR VEHICLES

FIELD OF THE INVENTION

The present invention relates to a radar sensor for motor vehicles, having an antenna system that can be controlled by a control device in such a way that it has a temporally varying directional characteristic, and having an evaluation device for evaluating the radar echoes received by the antenna system and for the location of objects using angular resolution.

BACKGROUND INFORMATION

Radar sensors for motor vehicles are used to acquire the surrounding traffic conditions in the context of driver assistance systems, for example for radar-supported distance regulation (ACC; Adaptive Cruise Control). A driver assistance system of this type is discussed for example in the publication "Adaptive Fahrgeschwindigkeitsregelung ACC (Adaptive Speed Regulation ACC)," Robert Bosch GmbH, Gelbe Reihe series, 2002 ed., Technische Unterrichtung. In addition to distance and relative speed, an important measurement quantity of the radar sensor is also the angle of the located objects.

Here, both the horizontal angle (azimuth angle) and the vertical angle (elevation angle) are important. The azimuth angle is used to estimate the transverse offset, and is thus used for lane assignment. The elevation angle makes it possible to distinguish between objects that can be driven under or driven over and objects that are genuine obstacles. Thus, in particular in safety applications (PSS; Predictive Safety Systems), false alarms due to metallic objects such as manhole covers, metal cans on the road surface, and the like can be avoided.

The azimuthal angular resolution capacity is in most cases achieved in that a plurality of radar lobes are produced having an angular offset from one another, in which the radar echoes are evaluated in separate channels. Scanning radar systems are also known in which the radar lobe is pivoted in the horizontal direction. An estimation of the elevation angle is possible for example through mechanical pivoting of the radar sensor in the vertical direction. For reasons of cost, however, the elevation angle is usually determined only indirectly, via a temporal evaluation of the back-scatter characteristic of objects.

For use in radar sensors for motor vehicles, so-called planar antenna devices or patch antennas are particularly suitable, because, due to their flat configuration, they can be produced easily and at low cost, for example using an etching method. Such an antenna device is typically a planar configuration of radiating resonators on an RF substrate, each resonator being assigned a particular amplitude and phase. The directional characteristic of the antenna system then results through superposition of the radiation diagrams of the individual patch elements.

German patent document DE 102 56 524 A1 discusses a device for measuring angular positions using radar pulses and overlapping radiation characteristics of at least two antenna elements.

SUMMARY OF THE INVENTION

An object of the exemplary embodiments and/or exemplary methods of the present invention is to create a radar sensor for motor vehicles that, with a relatively simple configuration, makes possible an estimation of the elevation angle of the located objects.

According to the exemplary embodiments and/or exemplary methods of the present invention, this object may be achieved in that the antenna system has at least two groups of antenna elements that differ in elevation in their effective direction, and that the control device is fashioned to activate and deactivate the two groups in a periodic exchange, and that the evaluation device is configured to estimate the elevation angle of the objects on the basis of a contrast between the radar echoes received by the various groups.

Due to the alternating activation of the two groups of antenna elements, the radar lobe is periodically pivoted vertically, so that a larger elevation angular area can be covered without loss of sensitivity and range. In general, the angular deviation between the two radar lobes can here be less than the angular expansion of a single radar lobe in its elevation, so that an object situated in front of the vehicle always remains in the field of view of the radar sensor, independent of which of the two groups of antenna elements is active at the moment. Consequently, the development of the distance, relative speed, and azimuth angle of the object can take place with a high degree of temporal resolution, and the simultaneous estimation of the elevation angle (with lower temporal resolution) supplies important additional information about the object, such as whether the object can be driven over or not, whether it is a truck or passenger vehicle, and the like. Changes in the inclination of the road surface, for example driving over a bump or driving through a dip, can in this way be recognized on the basis of the change in elevation angle of a vehicle traveling in front.

The estimation of the elevation angle can easily be achieved through the alternating activation and deactivation of two groups of antenna elements, and thus requires neither mechanical pivoting of the radar sensor nor the use of expensive phase shifting elements to change the phase relationships.

Advantageous embodiments of the present invention are indicated in the further descriptions herein.

Although in principle each "group" of antenna elements can also be made up of a single antenna element, each group may be made up of a plurality of antenna elements that are connected to a common supply network whose configuration determines the phase relationship between the individual antenna elements and thus determines the directional characteristic of the group. Optionally or in addition, however, lens elements may also be used to influence the directional characteristic.

In an advantageous specific embodiment, a bistatic antenna configuration is realized, i.e. separate antenna elements are provided for the transmission of the radar signal and the reception of the radar echo. For example, in order to receive the radar echo a plurality of antenna elements can be provided that are offset horizontally relative to the optical axis of a lens, so that a plurality of angularly offset radar lobes are produced that permit a determination of the azimuth angle of the objects.

In the following, an exemplary embodiment is explained in more detail on the basis of the drawings.

DETAILED DESCRIPTION

Figure 1:
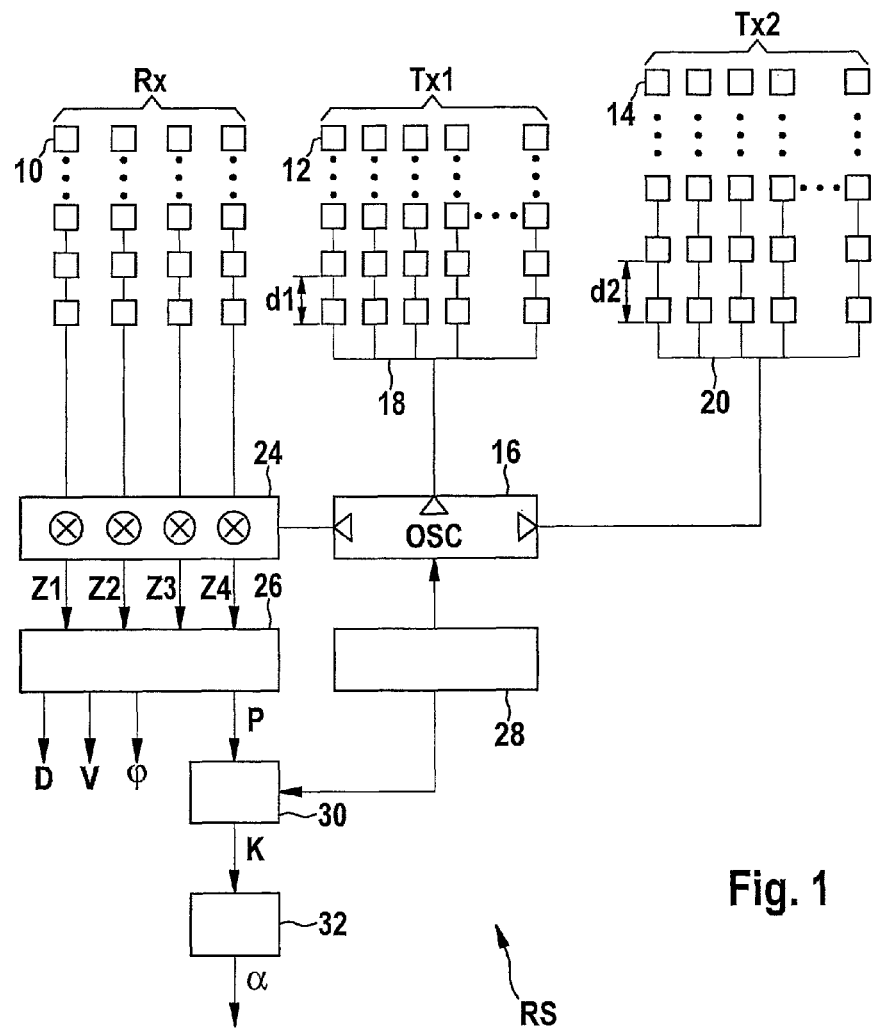
FIG. 1 shows a block diagram of a radar sensor according to the present invention.

Radar sensor RS shown in FIG. 1 has an antenna system having three groups Rx, Tx1, Tx2 of antenna elements 10, 12, 14. Antenna elements 12, 14 of groups Tx1 and Tx2 are used to transmit, in alternating fashion, a radar signal produced by a local oscillator 16. Antenna elements 12 of group Tx1 are configured in a plurality of columns that are oriented vertically and that each includes a plurality of antenna elements situated at uniform distances from one another. Via a supply network 18, the radar signal that is to be transmitted is distributed to the individual columns, and is then fed into the individual antenna elements 12 serially within each column. The columns have uniform horizontal distances from one another. Supply network 18 is configured such that all antenna elements 12 of group Tx1 are controlled with the same phase, so that the superposition of the radiation emitted by the individual antenna elements results in a bundling effect both in the azimuth and in the elevation. The main direction of radiation is perpendicular to the plane in which antenna elements 10, 12, 14 are situated, for example on a common radio-frequency substrate. So that the individual antenna elements 12 of a column are excited with the same phase, spacing d1 between two adjacent antenna elements 12 within a column agrees with wavelength $\lambda$ on the radio-frequency substrate (or is a whole-number multiple thereof).

The configuration of antenna elements 14 in group Tx2 is in principle the same as in group Tx1, but with the difference that spacing d2 between adjacent antenna elements 14 within a column differs from wavelength $\lambda$. In the depicted example, it is larger than this wavelength. This has the consequence that successive antenna elements 14 within each column have a particular phase shift from one another, so that superposition results in a radar lobe K2 (FIG. 2) whose main direction of radiation is pivoted in its elevation by a particular angle relative to the main direction of radiation of radar lobe K1 produced by group Tx1. The number of antenna elements 14 per column and the number of columns can here be the same as for antenna elements 12 of group Tx1, so that the bundling of radar lobe K2 in elevation essentially agrees with the bundling of radar lobe K1, and both radar lobes are also essentially equally strongly bundled in the azimuth. In addition, in group Tx2 the individual columns of antenna elements 14 are controlled with the same phase via a supply network 20, so that the main direction of radiation of radar lobe K2 in the azimuth is perpendicular to the substrate.

If the radar signal emitted either by group Tx1 or group Tx2 impinges on an object 22 (FIG. 2), for example a vehicle traveling in front, a part of the radar radiation is reflected and undergoes a Doppler shift that is a function of the relative speed of the object, and the reflected signal is then received by antenna elements 10 of group Rx. Antenna elements 10 of this group Rx are configured in four columns and are connected to one another in series within each column. Each column forms a receive channel and is connected to an input of a four-channel mixer 24. Oscillator 16 supplies the same signal to a different input of this four-channel mixer 24 that is also communicated to supply network 18 or 20. The signal received by each antenna column is mixed with the signal of local oscillator 16. Four-channel mixer 24 thus supplies, as a mixed product, four intermediate frequency signals Z1-Z4 whose frequency corresponds in each case to the frequency difference between the received signal and the signal of local oscillator 16.

Corresponding to the configuration of an FMCW (Frequency Modulated Continuous Wave) radar unit, the frequency of oscillator 16 is modulated with a ramp shape (distance d1 between antenna elements 12 therefore corresponds, strictly speaking, to the average wavelength of the transmitted signal). The frequency of the radar echo received by antenna elements 10 therefore differs from the signal of the local oscillator by an amount that is a function on the one hand of the signal runtime from the radar sensor to the object and back, and on the other hand, due to the Doppler effect, of the relative speed of the object. Correspondingly, intermediate frequency signals Z1-Z4 also contain information about the distance and relative speed of the object. In the frequency modulation, rising and falling frequency ramps alternate, and by once adding and once subtracting the intermediate frequency signals on the rising ramp and on the falling ramp, the portions that are a function of distance and the portions that are a function of speed can be separated from one another, so that values are obtained for distance D and relative speed V of each located object.

Intermediate frequency signals Z1-Z4 are supplied to an evaluation device 26, and are there recorded channel-by-channel, in each case over the duration of a frequency ramp, and are analyzed to form a spectrum using fast Fourier transformation. In this spectrum, each object is identified by a peak at the frequency determined by the respective object distance and relative speed.

The radar echoes received by the various columns of group Rx have a phase shift from one another that is a function of the respective azimuth angle $\phi$ of the object. Due to the bundling of the signal sent by group Tx1 or Tx2, the amplitude of the received radar echo is also a function of the azimuth angle of the object. Through comparison of the amplitude and phase differences with a corresponding antenna diagram, it is therefore also possible for azimuth angle $\phi$ to be determined in evaluation device 26.

An electronic control device 28 controls not only the frequency modulation of oscillator 16, but also causes the oscillator to send the signal that is to be transmitted to group Tx1 and to group Tx2 in alternating fashion. The active and inactive phases of groups Tx1 and Tx2 thus alternate periodically, for example with a period that corresponds to a complete cycle of the rising and falling frequency ramps of oscillator 16. The signal of control device 28, which brings about the changeover between supply networks 18 and 20, is also supplied to a contrast calculation unit 30 that moreover receives a signal P from evaluation device 26. For each located object, signal P indicates the strength (power) of the radar echo, for example averaged over all four channels. In the periods in which group Tx1 is used to send the radar signal, a power P1 is obtained in this way for a particular object, and in the periods in which group Tx2 is used to send the radar signal a power P2 is obtained for the same object. In contrast calculating unit 30, a contrast K is now calculated using the following equation:

$$K=(P1-P2)/(P1+P2)$$

On the basis of contrast K calculated in this way, in an elevation angle estimating unit 32 an estimated value can then be calculated for elevation angle α of the object, as is explained below with reference to FIGS. 2 through 4.

Figure 2:
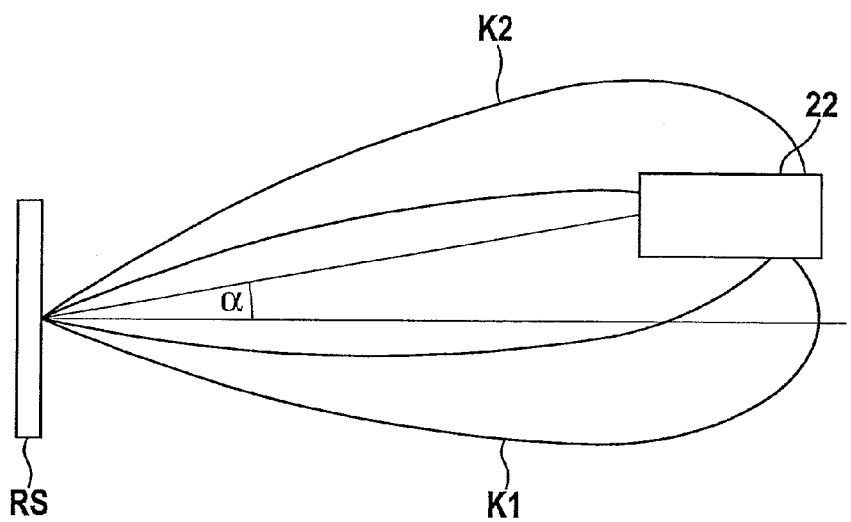
FIG. 2 shows a drawing explaining the functioning of the radar sensor in the estimation of the elevation angle of an object.

In FIG. 2, it is assumed that radar sensor RS is installed in a vehicle in such a way that the substrate on which antenna elements 10, 12, 14 are situated is oriented vertically. The main direction of radiation of radar lobe K1 produced by group Tx1 is then horizontal (corresponding to elevation angle α=0). In FIG. 3, curve K1' shows the corresponding angular distribution of the intensity of radar lobe K1. It will be seen that the maximum is at elevation angle 0°.

In contrast, due to the phase shift between antenna elements 14 of each column, group Tx2 produces radar lobe K2 whose main direction of radiation is inclined upward by a particular angle. The corresponding angular distribution of the intensity is shown by curve K2' in FIG. 3. It will be seen that here the maximum is at an elevation angle of 5°.

In the example shown in FIG. 2, object 22 is situated at an elevation angle α of approximately 4°. The consequence is that in the periods in which group Tx2 is active a relatively strong radar echo is obtained, because object 22 is situated approximately in the center of radar lobe K2, whereas in periods in which group Tx1 is active, a significantly weaker signal is obtained, because object 22 is situated more at the edge of corresponding radar lobe K1. Therefore, contrast K, calculated according to the above-indicated equation, is negative in this example.

Figure 3:
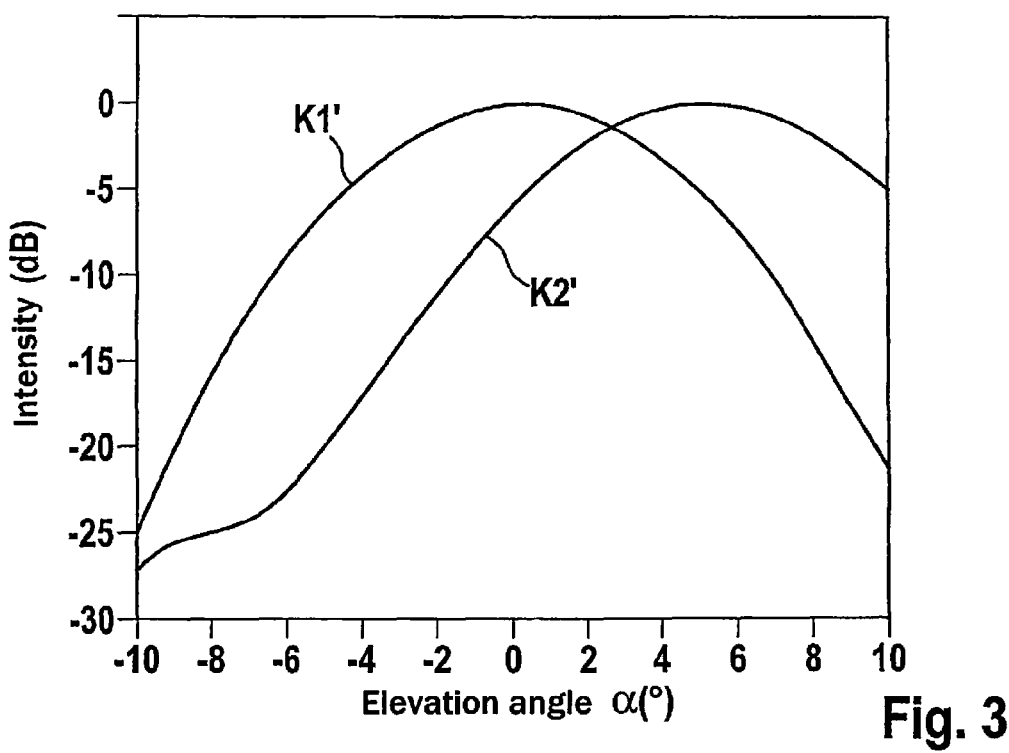
FIG. 3 shows elevation diagrams for two groups of antenna elements in the radar sensor according to FIG. 1.
Figure 4:
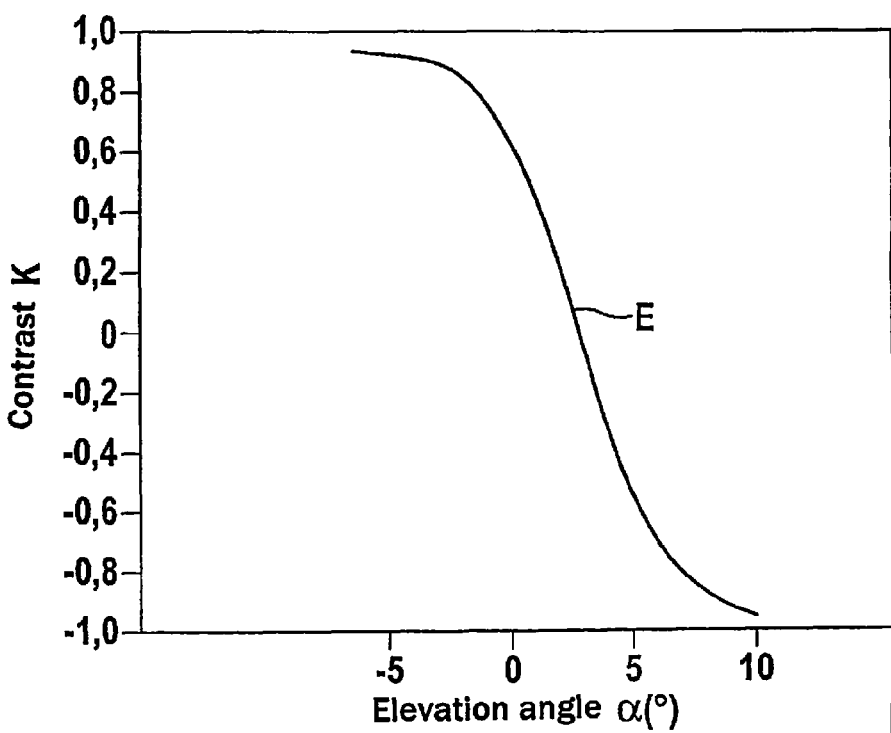
FIG. 4 shows a contrast curve that permits an estimation of the elevation angle.

According to the elevation diagrams shown in FIG. 3, for each elevation angle an associated value of contrast K can be calculated. The relation between contrast K and elevation angle α is indicated in FIG. 4 by curve E. On the basis of this curve, elevation angle α of the located object can then be determined in elevation angle estimating unit 32.

In FIG. 1, contrast calculating unit 30 and elevation angle estimating unit 32 are shown as separate units. In practice, however, these units are usually formed by software modules of an electronic data processing system that also carries out the functions of evaluating device 26 and of control device 28.

What is claimed is:

1. A radar sensor for motor vehicles, comprising:
    an antenna system that is controllable by a control device such that it has a temporally varying directional characteristic; and
    an evaluation device to evaluate radar echoes received by the antenna system and to locate objects using angular resolution;
    wherein the antenna system has at least two groups of antenna elements that differ in elevation in their effective direction,
    wherein the control device is configured to activate and deactivate the at least two groups in periodically alternating fashion,
    wherein the evaluation device is configured to estimate an elevation angle of the objects based on a contrast K between the radar echoes, and
    wherein the evaluation device is configured to calculate for each object a power parameter that forms a measure of a strength of a received radar echo, further comprising:
        a contrast calculating unit, appertaining to the evaluation device, to calculate, from a power P1 received during a period in which a radar signal is sent by a group of the antenna elements, and from a power P2 received during a period in which a radar signal is sent by a different group of the antenna elements, the contrast K according to an equation $K=(P1-P2)/(P1+P2)$, and
        an elevation angle estimating unit configured to determine the elevation angle of the object based on the contrast K.

2. The radar sensor of claim 1, wherein each group of the antenna elements has at least one vertically oriented column made up of a plurality of serially supplied antenna elements.

3. The radar sensor of claim 2, wherein each of the groups of antenna elements configured as a transmit antenna has a static supply network which feeds the radar signal that is to be transmitted into the antenna elements.

4. The radar sensor of claim 3, wherein the supply networks are connected to a common oscillator, and the control device is configured so as to switch the signal of the oscillator to the supply networks in alternating fashion.

5. The radar sensor of claim 1, wherein the at least two groups of the antenna elements are configured as transmit antennas, and at least one further group of antenna elements is configured as a receive antenna.

* * * * *